United States Patent
Yan

(10) Patent No.: US 12,524,155 B2
(45) Date of Patent: Jan. 13, 2026

(54) DATA WRITING METHOD AND APPARATUS BASED ON CACHE PARTITION AND MIRRORING RESPONSE, SOLID STATE DRIVE, ELECTRONIC DEVICE, AND NON-TRANSITORY READABLE STORAGE MEDIUM

(71) Applicant: SUZHOU METABRAIN INTELLIGENT TECHNOLOGY CO., LTD., Jiangsu (CN)

(72) Inventor: Xiuzhong Yan, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 19/184,692

(22) Filed: Apr. 21, 2025

(65) Prior Publication Data

US 2025/0251861 A1   Aug. 7, 2025

Related U.S. Application Data

(63) Continuation of application No. PCT/CN2024/083115, filed on Mar. 21, 2024.

(30) Foreign Application Priority Data

Apr. 10, 2023 (CN) .......................... 202310370623.7

(51) Int. Cl.
G06F 3/06 (2006.01)

(52) U.S. Cl.
CPC .......... *G06F 3/0611* (2013.01); *G06F 3/0659* (2013.01); *G06F 3/0679* (2013.01)

(58) Field of Classification Search
CPC .............................. G06F 3/0611; G06F 3/0659
See application file for complete search history.

(56) References Cited

U.S. PATENT DOCUMENTS

| 2003/0061240 | A1 | 3/2003 | McCann |
| 2011/0252187 | A1* | 10/2011 | Segal ............... G06F 12/0246 |
| | | | 711/E12.008 |

(Continued)

FOREIGN PATENT DOCUMENTS

| CN | 2011113336 A | 6/2011 |
| CN | 102163155 A | 8/2011 |

(Continued)

OTHER PUBLICATIONS

Wu, Suzhen et al. "LDM: Log Disk Mirroring with Improved Performance and Reliability for SSD-Based Disk Arrays" ACM Transactions on Storage, vol. 12, No. 4, May 20, 2016 (May 20, 2016), pp. 1-11.

(Continued)

*Primary Examiner* — Nicholas A. Paperno
(74) *Attorney, Agent, or Firm* — Scully, Scott, Murphy & Presser, P.C.

(57) ABSTRACT

A data writing method and apparatus, a solid state drive, an electronic device, and a non-transitory readable storage medium are provided. According to the method, data to be written is preprocessed. The preprocessed data blocks are mirrored to a first partition of a target solid state drive. Furthermore, response information of a mirroring result is sent to the target object, and then the preprocessed data blocks are written to a second partition of the target solid state drive from the first partition.

18 Claims, 4 Drawing Sheets

(56) References Cited

U.S. PATENT DOCUMENTS

| | | | | |
|---|---|---|---|---|
| 2015/0331806 | A1* | 11/2015 | Mondal | G06F 3/06 |
| | | | | 711/103 |
| 2016/0232112 | A1* | 8/2016 | Lee | G06F 13/1673 |
| 2019/0018601 | A1* | 1/2019 | Dubeyko | G06F 3/0619 |
| 2019/0369899 | A1* | 12/2019 | Tanpairoj | G06F 1/324 |
| 2021/0240363 | A1* | 8/2021 | Tumblin | G06F 21/6218 |

FOREIGN PATENT DOCUMENTS

| | | |
|---|---|---|
| CN | 103049220 A | 4/2013 |
| CN | 106293520 A | 1/2017 |
| CN | 107526535 A | 12/2017 |
| CN | 108268219 A | 7/2018 |
| CN | 110737716 A | 1/2020 |
| CN | 111666043 A | 9/2020 |
| CN | 113972989 A | 1/2022 |
| CN | 114489937 A | 5/2022 |
| CN | 114816270 A | 7/2022 |
| CN | 115048655 A | 9/2022 |
| CN | 115270033 A | 11/2022 |
| CN | 115454469 A | 12/2022 |
| CN | 115543871 A | 12/2022 |
| CN | 116107516 A | 5/2023 |
| WO | 2015173925 A1 | 11/2015 |

OTHER PUBLICATIONS

Liu Hongwei. "Design and Implementation of Secure Writing System for Key Data of Virtual SIM Card". Information Recording Materials, vol. 24, No. 3, Mar. 31, 2023(Mar. 21, 2023).

Jiguang Wan et al. "A New High-performance, Energy-efficient Replication Storage System with Reliability Guarantee". 2012 IEEE 28th Symposium on Mass Storage Systems and Technologies (MSST). Jul. 9, 2012 (Jul. 9, 2012).

Weijun Xiao et al. "PASS: A Hybrid Storage System for Performance-Synchronization Tradeoffs Using SSDS". 2012 IEEE 10th International Symposium on Parallel and Distributed Processing with Applications. Aug. 23, 2012 (Aug. 23, 2012).

The search report of PCT application No. PCT/CN2024/083115 issued on Jun. 15, 2024.

The search report of CN application No. 202310370623.7 issued on May 24, 2023.

* cited by examiner

DATA WRITING METHOD AND APPARATUS BASED ON CACHE PARTITION AND MIRRORING RESPONSE, SOLID STATE DRIVE, ELECTRONIC DEVICE, AND NON-TRANSITORY READABLE STORAGE MEDIUM

CROSS-REFERENCE TO RELATED APPLICATION

The present application claims the priority to the Chinese patent application No. 202310370623.7 filed to the China National Intellectual Property Administration on Apr. 10, 2023 and entitled "DATA WRITING METHOD AND APPARATUS, SOLID STATE DRIVE, ELECTRONIC DEVICE, AND STORAGE MEDIUM", which is incorporated herein in its entirety by reference.

TECHNICAL FIELD

The present application relates to the technical field of data processing, and in particular, to a data writing method and apparatus, a solid state drive, an electronic device, and a non-transitory readable storage medium.

BACKGROUND

With the continuous development of the hyper-convergence technology, software and hardware converged all-in-one machines are increasingly applied to various scenarios, which can rapidly respond to various reading and writing requests of front-end customers by mainly replying on the high Input Output Operations Per Second (IOPS) performance of an underlying solid state disk.

Usually, a writing request issued by a front-end customer includes a large number of random small data blocks. The solid state disk needs to write data one by one according to a writing requirement of each small data block. Response information of successful writing or failed writing is sent to the client after writing of all the small data blocks is completed, leading to low response efficiency.

SUMMARY

The present application provides a data writing method and apparatus, a solid state drive, an electronic device, and a non-transitory readable storage medium.

The present application provides a data writing method, including:
  a data writing request sent by a target object is received, and data to be written is acquired according to the data writing request;
  original data blocks in the data to be written are preprocessed to obtain a plurality of preprocessed data blocks of the data to be written, where the preprocessing includes at least one of segmentation and integration;
  the plurality of preprocessed data blocks are mirrored to a first partition of a target solid state drive;
  response information corresponding to the data to be written is acquired according to a mirroring result, and the response information is sent to the target object, where the response information includes writing state information; and
  the plurality of preprocessed data blocks are written to a second partition of the target solid state drive from the first partition;
  where the first partition is a data cache space for caching the data to be written, and the second partition is a data storage space for storing the data to be written.

According to the data writing method provided by the present application, the response information corresponding to the data to be written is acquired according to the mirroring result, includes:
  whether at least one abnormal data block is present among the plurality of preprocessed data blocks mirrored in the first partition is determined according to the mirroring result, where the abnormal data block includes a data block in a mirroring failure state or a data block in a checking failure state; and
  in a case that no abnormal data block is determined to be present among the plurality of preprocessed data blocks mirrored in the first partition, the response information is determined as first response information, where the first response information includes response information that a writing state of the data to be written is successful writing.

According to the data writing method provided by the present application, the data writing method further includes:
  in a case that the abnormal data block is determined to be present among the plurality of preprocessed data blocks mirrored in the first partition, a maximum delay duration is acquired in a configuration file of the target solid state drive;
  the plurality of preprocessed data blocks mirrored in the first partition are updated within the maximum delay duration until an updating stop condition is met; and
  the response information is acquired according to an updating result;
  where the updating stop condition includes at least one of following: no abnormal data block being present among the plurality of preprocessed data blocks mirrored in the first partition, an updating duration reaching the maximum delay duration.

According to the data writing method provided by the present application, the response information is acquired according to the updating result includes:
  in a case the abnormal data block is determined, according to the updating result, to be present among the plurality of preprocessed data blocks mirrored in the first partition in each updating process, the response information is determined as second response information, where the second response information includes response information that the writing state of the data to be written is failed writing; and
  in a case that no abnormal data block is determined, according to the updating result, to be present among the plurality of preprocessed data blocks mirrored in the first partition in at least one updating process, the response information is determined as the first response information.

According to the data writing method provided by the present application, whether the at least one abnormal data block is present among the plurality of preprocessed data blocks mirrored in the first partition is determined according to the mirroring result includes:
  at least one first data block to be checked in a mirroring success state among the plurality of preprocessed data blocks is determined according to the mirroring result;
  a first encoded value and second encoded values of the first data block to be checked are acquired, where the first encoded value is an encoded value generated before the first data block to be checked is mirrored to the first partition, and the second encoded values is encoded values generated in mirror files in the first partition after the first data block to be checked is mirrored to the mirror files;

the first data block to be checked is checked according to the first encoded value and the second encoded values of the first data block to be checked to obtain a checking result; and whether the abnormal data block is present among the plurality of preprocessed data blocks mirrored in the first partition is determined according to the checking result.

According to the data writing method provided by the present application, the first data block to be checked is checked according to the first encoded value and the second encoded values of the first data block to be checked to obtain the checking result includes:

the second encoded values of the first data block to be checked in the mirror files are compared to obtain a first comparison result;

in a case that the second encoded values of the first data block to be checked in the mirror files are determined, according to the first comparison result, to be identical, the second encoded value of the first data block to be checked in any mirror file is compared with the first encoded value of the first data block to be checked to obtain a second comparison result; and in a case that the second encoded value is determined, according to the second comparison result, to be identical with the first encoded value, the checking result is determined as checking of the first data block to be checked being successful.

According to the data writing method provided by the present application, the data writing method further includes:

in a case that the second encoded values of the first data block to be checked in the mirror files are determined, according to the first comparison result, to be different, the second encoded values of the first data block to be checked in the mirror files are compared with the first encoded value of the first data block to be checked to obtain third comparison results; and in a case that the second encoded values of the first data block to be checked in the mirror files are all determined, according to the third comparison results, to be different from the first encoded value of the first data block to be checked, the checking result is determined as checking of the first data block to be checked being failed;

where the plurality of preprocessed data blocks mirrored in the first partition are updated within the maximum delay duration includes:

the first data block to be checked is re-mirrored to the mirror files of the first partition within the maximum delay duration.

According to the data writing method provided by the present application, the data writing method further includes:

in a case that a first mirror file and a second mirror file are determined, according to the third comparison results, to be present in the first partition, the checking result is determined as checking of the first data block to be checked being failed, where the second encoded value of the first data block to be checked in the first mirror file is identical with the first encoded value of the first data block to be checked in the first mirror file, and the second encoded value of the first data block to be checked in the second mirror file is different from the first encoded value of the first data block to be checked in the first mirror file;

where the plurality of preprocessed data blocks mirrored in the first partition are updating within the maximum delay duration includes:

the plurality of preprocessed data blocks mirrored in the first mirror file are synchronized to the second mirror file within the maximum delay duration.

According to the data writing method provided by the present application, the plurality of preprocessed data blocks are written to the second partition of the target solid state drive from the first partition includes:

in a case that a remaining storage capacity of the second partition is monitored to be greater than or equal to a preset storage capacity, a writing strategy of the data to be written is acquired according to the data writing request;

writing priorities of the preprocessed data blocks are determined according to at least one of a writing sequence in the writing strategy and caching durations of the preprocessed data blocks in the first partition; and the preprocessed data blocks are written, according to the writing priorities, to the second partition of the target solid state drive from the first partition.

According to the data writing method provided by the present application, the writing priorities of the preprocessed data blocks are determined according to the caching durations of the preprocessed data blocks in the first partition includes:

in a case that any preprocessed data block with the caching duration longer than or equal to a maximum delay duration is present in the first partition, the writing priority of the any preprocessed data block is determined to be highest, where the maximum delay duration is acquired in a configuration file of the target solid state drive.

According to the data writing method provided by the present application, after the plurality of preprocessed data blocks are written to the second partition of the target solid state drive from the first partition, the data writing method further includes:

a preprocessed data block in a writing completion state is acquired as a second data block to be checked;

the second data block to be checked is checked;

in a case that the checking of the second data block to be checked is determined, according to a checking result, to be failed, a writing log of the second data block to be checked is acquired in a log partition of the target solid state drive;

a target mirror file is determined, according to the writing log, from a plurality of mirror files of the first partition; and the second data block to be checked is written to the second partition of the target solid state drive from the target mirror file.

According to the data writing method provided by the present application, the second data block to be checked is checked includes:

in a case that a writing strategy of the data to be written includes a consistency checking strategy, a parity check value of the second data block to be checked is calculated; and the parity check value of the second data block to be checked is compared with a preset parity value, and consistency checking is performed, according to a comparison result, on the second data block to be checked.

According to the data writing method provided by the present application, the plurality of preprocessed data blocks are mirrored to the first partition of the target solid state drive includes:

a mirroring request is sent, according to the plurality of preprocessed data blocks, to the first partition such that the first partition calls, according to the mirroring request and a local logical address management table, a target logical storage block to mirror the plurality of preprocessed data blocks to the first partition.

According to the data writing method provided by the present application, the original data blocks in the data to be written are preprocessed to obtain the plurality of preprocessed data blocks of the data to be written includes:

a configuration file of the target solid state drive is acquired, and a preset data block specification is acquired from the configuration file;

according to a data block specification of original data in the data to be written, the original data is sorted;

the original data is added, according to a sorting result, to a first data queue to obtain a second data queue;

at least one data block with a data block specification greater than the preset data block specification in the second data queue is segmented according to the preset data block specification;

the second data queue is updated according to a segmentation result to obtain a third data queue;

data blocks with a data block specification smaller than the preset data block specification in the third data queue are integrated according to the preset data block specification, and the third data queue is updated according to an integration result to obtain a target data queue; and the plurality of preprocessed data blocks are determined according to data blocks in the target data queue.

According to the data writing method provided by the present application, the data writing method further includes:

at least one written data block in a writing success state among the plurality of preprocessed data blocks is determined; and a local logical address management table of the first partition is updated according to the at least one written data block, and the at least one written data block is erased in the first partition.

According to the data writing method provided by the present application, before the plurality of preprocessed data blocks are mirrored to the first partition of the target solid state drive, the data writing method further includes:

an initialization operation is performed on the first partition and the second partition to obtain an initialization result;

in a case that warning information is determined to be present in the initialization result, the warning information is matched with at least one preset key word in a knowledge base to obtain at least one target key word matched with the warning information;

a candidate processing strategy corresponding to each target key word is determined in the knowledge base;

a first target processing strategy corresponding to the warning information is determined according to the candidate processing strategy corresponding to each target key word; and at least one processing component corresponding to the first target processing strategy is called to process the warning information.

According to the data writing method provided by the present application, the first target processing strategy corresponding to the warning information is determined according to the candidate processing strategy corresponding to each target key word includes:

a degree of association between each candidate processing strategy and the warning information is determined according to a number of candidate processing strategies; and a candidate processing strategy with a maximum degree of association is determined as the first target processing strategy.

According to the data writing method provided by the present application, the data writing method further includes:

a processing result of the warning information is acquired;

in a case that the processing result of the warning information is successful processing, at least one key word is extracted from the warning information to obtain at least one newly added key word; and the newly added key word and the first target processing strategy are updated to the knowledge base.

According to the data writing method provided by the present application, the data writing method further includes:

in a case that the processing result of the warning information is failed processing, the warning information is sent to a client such that the client processes, according to a second target processing strategy, the warning information;

warning processing information returned by the client is monitored, and in a case that a processing state of the warning information is determined, according to the warning processing information, to be successful processing, the second target processing strategy is acquired; and at least one newly added key word extracted from the warning information and the second target processing strategy are updated to the knowledge base.

According to the data writing method provided by the present application, the plurality of preprocessed data blocks are mirrored to the first partition of the target solid state drive includes:

the plurality of preprocessed data blocks are mirrored to a main cache space and an auxiliary cache space of the first partition, where the main cache space and the auxiliary cache space belong to different failure domains; and the plurality of preprocessed data blocks are written to the second partition of the target solid state drive from the first partition includes:

the plurality of preprocessed data blocks are written to the second partition from any one of the main cache space and the auxiliary cache space.

According to the data writing method provided by the present application, before the plurality of preprocessed data blocks are mirrored to the first partition of the target solid state drive, the data writing method further includes:

division proportions of partitions in the target solid state drive are acquired according to a configuration file of the target solid state drive;

a capacity of the first partition and a capacity of the second partition are determined according to the division proportions of the partitions; and the target solid state drive is partitioned according to the capacity of the first partition and the capacity of the second partition to obtain the first partition and the second partition.

The present application further provides a data writing apparatus, including:

an acquisition module, configured to receive a data writing request sent by a target object, and acquire data to be written according to the data writing request;

a processing module, configured to preprocess original data blocks in the data to be written to obtain a plurality of preprocessed data blocks of the data to be written, where the preprocessing includes at least one of segmentation and integration;

a mirroring module, configured to mirror the plurality of preprocessed data blocks to a first partition of a target solid state drive;

a response module, configured to acquire, according to a mirroring result, response information corresponding to the data to be written, and send the response information to the target object, where the response information includes writing state information; and a writing module, configured to write the plurality of preprocessed data blocks to a second partition of the target solid state drive from the first partition;

where the first partition is a data cache space for caching the data to be written, and the second partition is a data storage space for storing the data to be written.

The present application further provides a solid state drive, including a control chip and a storage chip, where the storage chip includes a first partition, a second partition, and a log partition; and the control chip implements, when executing a computer program, any data writing method as described above.

The present application further provides an electronic device, including a memory, a processor, and a computer program stored on the memory and runnable on the processor, where the processor implements, when executing the computer program, any data writing method as described above.

The present application further provides a non-transitory readable storage medium, storing a computer program which, when executed by a processor, implements any data writing method as described above.

The present application further provides a computer program product, including a computer program which, when executed by a processor, implements any data writing method as described above.

BRIEF DESCRIPTION OF THE DRAWINGS

In order to illustrate technical solutions in the present application or in the prior art more clearly, the drawings required in the description of embodiments or the prior art will be introduced briefly below. Apparently, the drawings in the following description show some embodiments of the present application, and those of ordinary skill in the art may still derive other drawings from these drawings without creative efforts.

FIG. 4 is a system architecture which a data writing method in a embodiment of the present disclosure based on;

DETAILED DESCRIPTION OF THE EMBODIMENTS

To make the objectives, the technical solutions, and the advantages of the present application clearer, the technical solutions in the present application will be described clearly and completely below with reference to the accompanying drawings in the present application. Apparently, the described embodiments are part of rather than all of the embodiments of the present application. All the other embodiments obtained by those of ordinary skill in the art based on the embodiments in the present application without creative effort fall within the scope of protection of the present application.

The present application provides a data writing method and apparatus, a solid state drive, an electronic device, and a non-transitory readable storage medium for overcoming the defect of low writing response efficiency in the related technology, thereby improving the data writing response efficiency while ensuring effective data writing.

Figure 1:
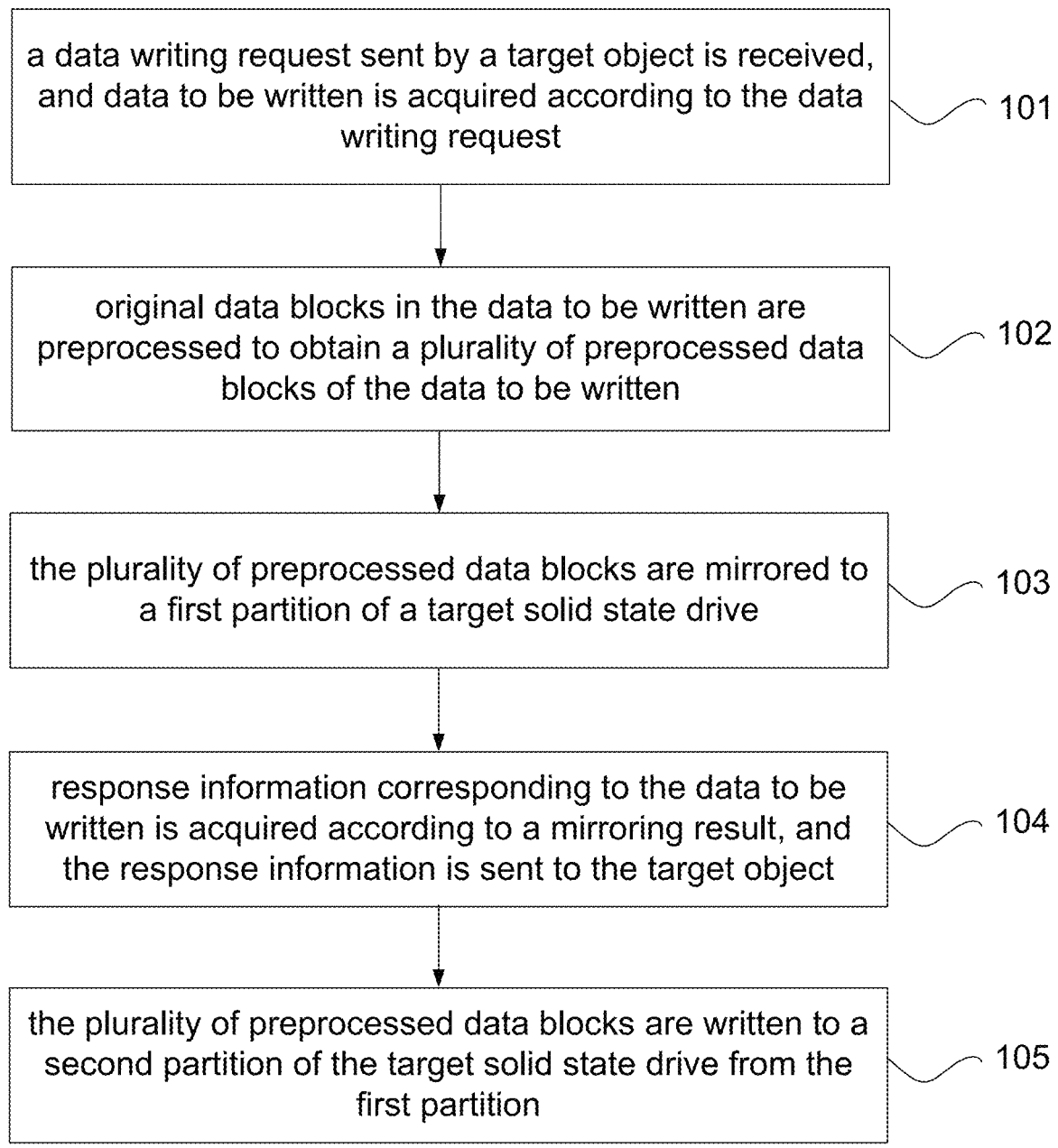
FIG. 1 is a flowchart I of a data writing method provided by the present application.
Figure 2:
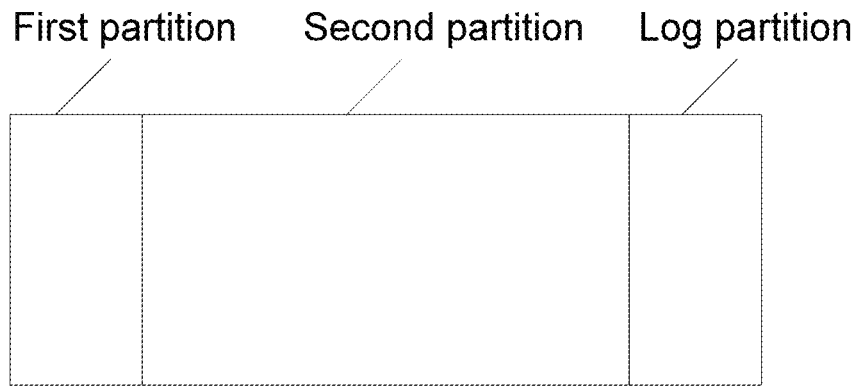
FIG. 2 is a schematic structural diagram of a solid state drive provided by the present application.
Figure 3:
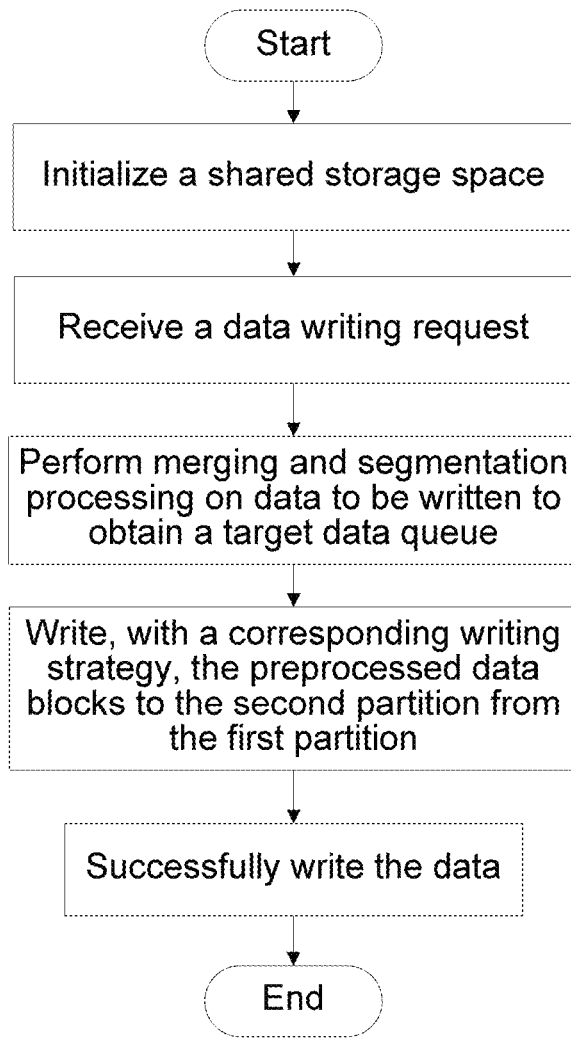
FIG. 3 is a flowchart II of a data writing method provided by the present application.

A data writing method of the present application is described without reference to FIGS. 1-3. The data writing method in the present embodiment may be applied to various devices in need of data writing, such as a hyper-converged all-in-one machine or a single server. The hyper-converged all-in-one machine is a multi-server cluster integrated with computing, storage, and network convergence, in which software and hardware are integrated. An underlying storage system of the hyper-converged all-in-one machine needs to use a plurality of groups of solid state disks, and may perform data sharing and storage. A pooling virtual device constituted by the underlying storage system of the hyper-converged all-in-one machine breaks the limitations of a physical host.

The data writing method provided by the present embodiment is described below by taking as an example that the application scenario is the hyper-converged all-in-one machine.

As shown in FIG. 1, there is shown a flowchart I of the data writing method provided by the present embodiment. The data writing method includes the following steps.

Step 101, a data writing request sent by a target object is received, and data to be written and a writing strategy of the data to be written are acquired according to the data writing request.

The target object may be a front-end system of a host to which a target solid state drive belongs or other hosts sharing storage with the host to which the target solid state drive belongs, which will not be limited in the present embodiment.

The data writing request is configured to request writing of the data to be written, which is issued when data writing is required.

The data writing request may be a user input to the front-end system of the host, or may be information generated by a controller of the host under a certain condition, such as a data writing request triggered periodically. The so-called user input may be information input by touch, drop-down selection, voice, gestures, vision, a brain machine, etc.

Optionally, the data writing request is monitored in real time. If the data writing request is monitored, the data to be written and the writing strategy of the data to be written are directly parsed from the data writing request; or a writing request identifier is parsed from the data writing request, a identifier of the data to be written and a writing strategy identifier corresponding to the writing request identifier are acquired according to the writing request identifier, and the data to be written and the writing strategy of the data to be written corresponding to the identifier of the data to be written and the writing strategy identifier are acquired according to the identifier of the data to be written and the writing strategy identifier. This is not limited in the present embodiment.

After the writing strategy is acquired, the writing strategy may be stored in a log partition for subsequent use at any time.

The data to be written is data needing to be written to the target solid state drive, and includes at least one original data block therein.

The writing strategy includes, but is not limited to, a destination address to which the data blocks in the data to be written needs to be written, a checking strategy, and a writing sequence, which are not limited in the present embodiment.

Step 102, original data blocks in the data to be written are preprocessed to obtain a plurality of preprocessed data blocks of the data to be written, where the preprocessing includes at least one of segmentation and integration.

Since the original data blocks in the data to be written are different in specification and have a certain randomness, the actually written physical data volume is caused to be multiple times the written data volume, leading to a serious write amplification problem of a solid state disk, and since users have increasingly high requirements on data copies (such as RAID5, RAID6, or RAID10), the full flash hyper-converged all-in-one machine may not reach the expected performance in many scenarios (a writing request of a large number of random small data blocks), which greatly affects the experience of customers.

In view of the above problems, the related art proposes solutions. For example, the times of randomly writing small data blocks are reduced at a code logic level and batch writing compression is realized. However, this solution needs to strongly rely on the design of a top-level software system, and may not be adapted to variable customer requirements. For another example, the written data is compressed using a main control chip of the solid state disk, and this solution needs to strongly rely on hardware function support and causes loss in performance. The hyper-converged all-in-one machine may not control the code logic of a top-level application, needs to carry various application programs, and also may not be forcibly bound to related hardware and needs to be compatible with a plurality of solid state disks. This is difficult to apply to the hyper-converged all-in-one machine.

According to the method provided by the present embodiment, before the data to be written is written to a first partition, the randomly written small data blocks in the data to be written received by the full flash hyper-converged all-in-one machine are preprocessed, that is, the small data blocks in the data to be written are merged, and a large data block is segmented and reintegrated such that the re-merged segmented data blocks are adaptive to a minimum processing unit of a solid state disk erasing operation. The write amplification problem caused by requesting the solid state disk to erase blocks (i.e., data blocks) for a plurality of times may be reduced; and extra loss caused by solid state disk write amplification may be reduced so as to be ready for writing a whole block to the solid state disk.

Here, the preprocessed data blocks refer to data blocks finally formed by segmentation and/or integration preprocessing.

Here, the sequence of the segmentation step and the integration step may be configured according to an actual requirement. For example, segmentation is performed first and then integration is performed, or integration is performed first and then segmentation is performed.

Step 103, the plurality of preprocessed data blocks are mirrored to a first partition of a target solid state drive, where the first partition is a data cache space for caching the data to be written, and the second partition is a data storage space for storing the data to be written.

As shown in FIG. 2, there is shown a schematic structural diagram of a target solid state drive. A storage chip of the target solid state drive may be divided at least into three partitions, i.e., a first partition, a second partition, and a log partition, where the first partition is a data cache space for caching the data to be written, the second partition is a data storage space for storing the data to be written, and the log partition is a configured to store various operation logs and writing strategies.

As shown in FIG. 3, after the original data blocks of the data to be written are re-segmented and integrated, the plurality of preprocessed data blocks obtained by preprocessing are mirrored to a plurality of mirror files in the first partition of the target solid state drive, which may not be limited in the present embodiment.

The way of mirroring may be RAID1, RAID5, RAID6, or RAID10, which may not be limited in the present embodiment.

It needs to be noted that two copies mirrored may be placed in different failure domains to prevent data damage caused by loss of the copies.

Data redundancy may be realized by mirroring the plurality of preprocessed data blocks of the data to be written to the plurality of mirror files in the first partition. This not only may ensure that data may be synchronized from another mirror file when data in one mirror file is invalid, but also is convenient for directly reading data from the mirror files when the original data is busy. The reading performance is improved, achieving the improvement of the data reading and writing reliability through mirroring fault tolerance.

Step 104, response information corresponding to the data to be written is acquired according to a mirroring result, and the response information is sent to the target object, where the response information includes writing state information.

Optionally, since the mirroring result may be stored in real time in the log partition in the mirroring process, after the completion of mirroring, the mirroring result may be acquired from the log partition, such that mirroring states of the plurality of preprocessed data blocks mirrored in the first partition are determined according to the mirroring result, and whether the preprocessed data blocks are mirrored integrally and correctly to the first partition is further determined according to the mirroring states.

After the preprocessed data blocks are all determined to be mirrored integrally and correctly to the first partition, it may be ensured that the data to be written may be written integrally and correctly to a second partition from the first partition, that is, the response information that a writing state of the data to be written is successful writing is sent to the target object in real time, thereby improving the response efficiency, and after the response information is sent, the preprocessed data blocks of the data to be written may be rapidly written to the second partition of the target solid state drive from the first partition under the condition of being imperceptible to the client within a short time.

When it is determined that part of the preprocessed data blocks may not be mirrored integrally and correctly to the first partition, the data to be written mirrored in the first partition may be updated within a certain delay duration such that the preprocessed data blocks of the data to be written are mirrored integrally and correctly in the updated first partition. In this case, the response information that the writing state of the data to be written is successful writing may also be sent to the target object in real time.

If it is unable to integrally and correctly mirror the preprocessed data blocks of the data to be written in the updated first partition within a certain delay duration, it may not be ensured that the plurality of preprocessed data blocks of the data to be written may not be written integrally and correctly to the second partition from the first partition. At this point, the response information that the writing state of the data to be written is failed writing is sent to the target object in real time.

The way of further determining, according to the mirroring state, whether the preprocessed data blocks are mirrored integrally and correctly to the first partition includes: whether at least one abnormal data block is present among the plurality of preprocessed data blocks mirrored in the first partition, i.e., whether at least one data block in a mirroring failure state or at least one data block in a checking failure state is present, is determined according to the mirroring state; if the abnormal data block is determined, according to the mirroring state, to be present among the plurality of preprocessed data blocks mirrored in the first partition, it is determined that the preprocessed data blocks may not be mirrored integrally and correctly to the first partition; and if no abnormal data block is determined, according to the mirroring state, to be present among the plurality of preprocessed data blocks mirrored in the first partition, it is determined that all the preprocessed data blocks may be mirrored integrally and correctly to the first partition.

In the present embodiment, the plurality of preprocessed data blocks of the data to be written are firstly cached in the first partition in the data mirroring manner. The data reading and writing reliability is improved through mirroring fault tolerance. Even though the writing is failed, the data may be rapidly updated in the local first partition of the target solid state drive, thereby avoiding a requesting delayed time required by requesting data from the target object and improving the data writing performance and the writing efficiency. In addition, since the original writing strategy of the data is not taken into account in the data mirroring process, the mirroring efficiency is obviously higher than the data writing efficiency, and data mirroring is adopted, i.e., whether the mirrored data to be written may be written integrally and correctly to the second partition of the target solid state drive from the first partition is determined, that is, the response information may be sent to the client at the mirroring stage, real-time response may be realized without waiting for the completion of writing of all the data blocks. The delayed response time caused by data block writing may be effectively reduced, thus improving the data writing response efficiency and then enhancing the user experience.

Step 105, the plurality of preprocessed data blocks are written to a second partition of the target solid state drive from the first partition.

As shown in FIG. 3, the resource utilization of the second partition is monitored at the same time of sending the response information to the target object such that when an idle resource is present in the second partition, the preprocessed data blocks in the first partition are finally written according to the corresponding writing strategy of the data writing request (i.e., the data is written to the second partition). Meanwhile, related checking such as consistency checking may also be performed on the written preprocessed data blocks. This process is imperceptible to terminal customers.

Optionally, the writing strategy may be acquired in the log partition, and the preprocessed data blocks in the data to be written are written, according to the destination address to which the data to be written needs to be written and the writing sequence in the writing strategy, from the first partition to the second partition. The completely written preprocessed data blocks may also be checked according to the checking strategy in the writing strategy to determine that the preprocessed data blocks of the data to be written may be written integrally and correctly to the second partition from the first partition.

According to the data writing method provided by the present embodiment, the data to be written is preprocessed first, and the preprocessed data blocks are mirrored to the first partition of the target solid state drive. On the one hand, data redundancy may be realized through data mirroring, and the problem of data write amplification may be avoided through data preprocessing, thereby effectively ensuring effective writing of the data to be written. On the other hand, upon obtaining the mirroring result, whether the data to be written may be mirrored integrally and correctly to the first partition of the target solid state drive may be determined, and whether the data to be written may be written integrally and correctly to the second partition of the target solid state drive from the first partition may be further determined. Thus, the response information may be sent to the client at the mirroring stage. Real-time response may be realized without waiting for the completion of writing of all the data blocks. The delayed response time caused by data block writing may be effectively reduced, thus improving the data writing response efficiency.

In some embodiments, the response information corresponding to the data to be written is acquired according to a mirroring result includes:
  whether at least one abnormal data block is present among the plurality of preprocessed data blocks mirrored in the first partition is determined according to the mirroring result, where the abnormal data block includes a data block in a mirroring failure state or a data block in a checking failure state; and
  if no abnormal data block is determined to be present among the plurality of preprocessed data blocks mirrored in the first partition, the response information is determined as first response information, where the first response information includes response information that a writing state of the data to be written is successful writing.

Optionally, after the mirroring result (i.e., the mirroring result after all the preprocessed data blocks in the data to be written are all mirrored) is acquired, the mirroring states and the checking states of the preprocessed data blocks in the data to be written mirrored in the first partition may be directly acquired according to the mirroring result. That is, the mirroring process includes not only data mirroring, but also data check.

If it is determined, according to the mirroring states and the checking states, that no preprocessed data block in the mirroring failure state or no preprocessed data block in the checking failure state is present among the plurality of preprocessed data blocks mirrored in the first partition, i.e., all the preprocessed data blocks in the data to be written mirrored in the first partition are in the successfully mirrored and successfully checked states, it indicates that the preprocessed data blocks in the data to be written mirrored in the first partition are all written integrally and correctly to the first partition. On the one hand, the integral and correct data to be written is cached in the first partition; and on the other hand, data redundancy may be realized through data mirroring.

Therefore, effective writing of the data to be written may be ensured effectively. At this point, the response information of successful writing may be fed back to the target object so that the data response efficiency may reach the RAID1 level. The data writing response efficiency is effectively improved.

In some embodiments, the method further includes:
if the abnormal data block is determined to be present among the plurality of preprocessed data blocks mirrored in the first partition, a maximum delay duration is acquired in a configuration file of the target solid state drive;
the plurality of preprocessed data blocks mirrored in the first partition are updated within the maximum delay duration until an updating stop condition is met; and
the response information is acquired according to an updating result;
where the updating stop condition includes at least one of following: no abnormal data block being present among the plurality of preprocessed data blocks mirrored in the first partition, an updating duration reaching the maximum delay duration.

It needs to be noted that the maximum delay duration is jointly determined according to a minimum tolerable delayed time of the data to be written that the user needs to read and a safety margin delay time. That is, if the response information that the writing state of the data to be written is successful writing is fed back to the user, it needs to be ensured within the maximum delay time that the data may be mirrored successfully. Thus, it may be further ensured that when the user needs to read the data to be written, the data to be written may be acquired successfully, thereby enhancing the user experience and ensuring the data writing response efficiency while guaranteeing successful data writing.

Optionally, if the data block in the mirroring failure state or the preprocessed data block in the checking failure state is present among the plurality of preprocessed data blocks mirrored in the first partition, it indicates that the abnormal data block not written integrally and correctly is present among the plurality of preprocessed data blocks mirrored in the first partition. At this point, the data block in the mirroring failure state or the preprocessed data block in the checking failure state may be regarded as the abnormal data block, and the plurality of preprocessed data blocks mirrored in the first partition are re-updated within the maximum delay duration until no abnormal data block is present among the plurality of preprocessed data blocks mirrored in the first partition, and/or if the updating duration reaches the maximum delay duration, updating is stopped. Whether all the preprocessed data blocks are mirrored successfully is determined according to the updating result, and if checking is successful, it is determined thereby that the response information of failed writing or successful writing is fed back to the target object.

According to the method provided by the present embodiment, when the abnormal data block is present among the plurality of preprocessed data blocks mirrored in the first partition, the plurality of preprocessed data blocks mirrored in the first partition may be updated within the maximum delay duration. That is, a fault tolerant measure may be configured for data writing, and the response information of failed writing or successful writing may be further determined according to the updating result. The user experience may be enhanced and the data writing response efficiency may be ensured while the fault tolerance of data writing is improved.

In some embodiments, the response information is acquired according to an updating result includes:
if the abnormal data block is determined, according to the updating result, to be present among the plurality of preprocessed data blocks mirrored in the first partition in each updating process, the response information is determined as second response information, where the second response information includes response information that the writing state of the data to be written is failed writing; and
if no abnormal data block is determined, according to the updating result, to be present among the plurality of preprocessed data blocks mirrored in the first partition in at least one updating process, the response information is determined as the first response information.

Optionally, if it is determined that no data block in the mirroring failure state or no data block in the checking failure state is present among the plurality of preprocessed data blocks mirrored in the first partition in any updating process, it may be determined that the data to be written is mirrored integrally and correctly to the first partition of the target solid state drive. At this point, the response information of successful writing may be fed back to the target object so that the data response efficiency may reach the RAID1 level. If it is determined that the data block in the mirroring failure state or the data block in the checking failure state is still present among the plurality of preprocessed data blocks mirrored in the first partition in all the updating processes, it may be determined that the data to be written may not be mirrored integrally and correctly to the first partition of the target solid state drive. At this point, the response information of failed writing may be fed back to the target object.

According to the method provided by the present embodiment, the plurality of preprocessed data blocks of the data to be written mirrored in the first partition are updated within the maximum delay duration such that the response information of failed writing or successful writing is further determined according to the updating result. The user experience may be enhanced and the data writing response efficiency may be ensured while the fault tolerance of data writing is further improved.

In some embodiments, whether the at least one abnormal data block is present among the plurality of preprocessed data blocks mirrored in the first partition is determined according to the mirroring result includes:
at least one first data block to be checked in a mirroring success state among the plurality of preprocessed data blocks is determined according to the mirroring result;
a first encoded value and second encoded values of the first data block to be checked are acquired, where the first encoded value is an encoded value generated before the first data block to be checked is mirrored to the first partition, and the second encoded values are encoded values generated in mirror files in the first partition after the first data block to be checked is mirrored to the mirror files;

the first data block to be checked is checked according to the first encoded value and the second encoded values of the first data block to be checked to obtain a checking result; and whether the abnormal data block is present among the plurality of preprocessed data blocks mirrored in the first partition is determined according to the checking result.

Optionally, the first data block to be checked in the mirroring success state is selected according to the mirroring result from the plurality of preprocessed data blocks, and the encoded value generated before the first data block to be checked is mirrored to the first partition, i.e., the first encoded value, and the encoded values generated by mirroring the first data block to be checked to the mirror files, i.e., the second encoded values, are acquired. The encoding modes required before mirroring to the first partition and after mirroring the first data block to be checked are consistent, e.g., MD5 encoding.

Since the encoding modes used before and after mirroring to the first partition are consistent, if the first data block to be checked is mirrored integrally and correctly to the first partition, it needs to be ensured that the encoding of the first data block to be checked is consistent before mirroring to the first partition and after mirroring the first data block to be checked.

Therefore, the first encoded value and the second encoded values of the first data block to be checked then need to be compared to determine whether the encoded values of the first data block to be checked are identical (i.e., whether the second encoded values are identical with the first encoded value), and whether the first data block to be checked passes checking is determined according to the comparison results, thereby determining whether the abnormal data block is present in the data to be written mirrored in the first partition, i.e., whether the first data block to be checked is the abnormal data block.

Here, the sequence of comparing the second encoded values of the first data block to be checked in the mirror files and the first encoded value may be determined according to an actual requirement. In an example, the second encoded values of the first data block to be checked in the mirror files may be compared first and then compared with the first encoded value of the first data block to be checked; or each of the second encoded values of the first data block to be checked in the mirror files is compared with the first encoded value of the first data block to be checked respectively.

According to the method provided by the present embodiment, by comparing whether the encoding of the first data block to be checked is consistent before mirroring to the first partition and after mirroring the first data block to be checked, whether the abnormal data block is present among the plurality of preprocessed data blocks mirrored in the first partition may be determined efficiently and accurately. The efficiency of feeding back the data writing response information may be further improved while the simplicity and convenience of data checking are improved.

In some embodiments, the first data block to be checked is checked according to the first encoded value and the second encoded values of the first data block to be checked to obtain the checking result includes:

the second encoded values of the first data block to be checked in the mirror files are compared to obtain a first comparison result;

if the second encoded values of the first data block to be checked in the mirror files are determined, according to the first comparison result, to be identical, the second encoded value of the first data block to be checked in any mirror file is compared with the first encoded value of the first data block to be checked to obtain a second comparison result; and if the second encoded value is determined, according to the second comparison result, to be identical with the first encoded value, the checking result is determined as checking of the first data block to be checked being successful.

Optionally, the step of checking the first data block to be checked includes:

firstly, whether the second encoded values of the first data block to be checked in the mirror files are identical is compared; and if the second encoded values of the first data block to be checked in the mirror files are identical, the second encoded value of the first data block to be checked in one mirror file needs to be further compared with the first encoded value of the first data block to be checked to determine whether the encoded values of the first data block to be checked before and after mirroring are identical, thereby determining whether the first data block to be checked successfully mirrored in the mirror files passes checking, i.e., checking whether the first data block to be checked is correct and integral.

If it is further determined, according to the second comparison result, that the second encoded value is identical with the first encoded value, it indicates that the checking of the first data block to be checked is successful.

If all the preprocessed data blocks in the data to be written mirrored to the first partition are in the mirroring success state and pass the checking, it indicates that the data to be written may be mirrored integrally and correctly to the first partition. At this point, the response information that the writing state of the data to be written is successful writing may be sent to the target object.

According to the method provided by the present embodiment, by comparing the consistency of the encoding of the first data block to be checked before mirroring to the first partition and after mirroring the first data block to be checked, the correctness and integrity of the data to be written mirrored to the first partition may be checked simply and conveniently, and the response information may be fed back to the target object in real time according to the checking result. Thus, the efficiency of feeding back the data writing response information may be further improved while effective writing of the data to be written to the second partition is ensured.

In some embodiments, the method further includes:

if the second encoded values of the first data block to be checked in the mirror files are determined, according to the first comparison result, to be different, the second encoded values of the first data block to be checked in the mirror files are compared with the first encoded value of the first data block to be checked to obtain third comparison results; and if the second encoded values of the first data block to be checked in the mirror files are all determined, according to the third comparison results, to be different from the first encoded value of the first data block to be checked, the checking result is determined as checking of the first data block to be checked being failed;

where the plurality of preprocessed data blocks mirrored in the first partition are updated within the maximum delay duration includes:

the first data block to be checked is re-mirrored to the mirror files of the first partition within the maximum delay duration.

Optionally, if it is determined, in the first comparison result, that the second encoded values of the first data block to be checked in the mirror files are different, it indicates that a writing anomaly occurs when the mirrored data is written to the mirror files. At this point, comparison with the first encoded value of the first data block to be checked needs to be further performed to further locate the root of the mirroring error. That is, whether the anomaly of the first data block to be checked written in the mirror files is caused by an anomaly occurring in the data reading process or an anomaly occurring in the process of writing the data to the mirror files is determined.

Optionally, if it is determined that the second encoded values of the first data block to be checked in the mirror files are all different from the first encoded value of the first data block to be checked, it indicates that anomalies occur in both the data reading process and the process of writing the data to the mirror files. At this point, it indicates that the checking of the first data block to be checked is failed, i.e., the abnormal data block is present in the data to be written (i.e., the plurality of preprocessed data blocks) mirrored in the first partition. At this point, a data mirroring request needs to be re-initiated, and a plurality of re-mirroring requests are made within the maximum delay duration. The re-mirroring operation is stopped until no abnormal data block is present among the plurality of preprocessed data blocks mirrored in the mirror files in the first partition, and/or the updating duration reaches the maximum delay duration. The corresponding response information may be sent to the target object according to this re-mirroring result.

According to the method provided by the present embodiment, if the second encoded values of the first data block to be checked in the mirror files are different, the second encoded values of the data block are further compared with the first encoded value of the first data block to be checked so that the root of abnormal mirroring of the first data block to be checked may be located accurately, thereby realizing timely repair and determining the correctness and integrity of the data to be written mirrored to the first partition. Thus, the efficiency of feeding back the data writing response information may be further improved while effective writing of the data to be written to the second partition is ensured.

In some embodiments, the method further includes:
if a first mirror file and a second mirror file are determined, according to the third comparison results, to be present in the first partition, the checking result is determined as checking of the first data block to be checked being failed, where the second encoded value of the first data block to be checked in the first mirror file is identical with the first encoded value of the first data block to be checked in the first mirror file, and the second encoded value of the first data block to be checked in the second mirror file is different from the first encoded value of the first data block to be checked in the second mirror file;
where the plurality of preprocessed data blocks mirrored in the first partition are updated within the maximum delay duration includes:
the plurality of preprocessed data blocks mirrored in the first mirror file are synchronized to the second mirror file within the maximum delay duration.

Optionally, if it is determined, in the third comparison result, that the second encoded values of the first data block to be checked in some first mirror files in the first partition are identical with the first encoded value of the first data block to be checked while the second encoded values of the first data block to be checked in some second mirror files are different from the first encoded value of the first data block to be checked, it indicates that an anomaly occurs when the mirrored data is written to the second mirror files. At this point, the mirrored data of the second mirror files may be abandoned, and a copy of mirrored data is requested to be synchronized from the first mirror file such that the data to be written is mirrored integrally and correctly in the mirror files in the first partition.

According to the method provided by the present embodiment, on the one hand, the data is directly repaired locally, and then the response information may be fed back, thereby effectively improving the information response efficiency; and on the other hand, redundant copies may be provided for data writing to the second partition. Even though writing to the second partition through one mirror file is failed, data may also be written directly through another mirror file. Data re-writing may be completed locally with no need to frequently access the target object, thereby reducing the data requesting time delay and the remote data transmission time delay, and improving the data writing efficiency while effectively ensuring the data writing performance.

In some embodiments, step 105 further includes:
if a remaining storage capacity of the second partition is monitored to be greater than or equal to a preset storage capacity, a writing strategy of the data to be written is acquired according to the data writing request;
writing priorities of the preprocessed data blocks are determined according to at least one of a writing sequence in the writing strategy and caching durations of the preprocessed data blocks in the first partition; and
the preprocessed data blocks are written, according to the writing priorities, to the second partition of the target solid state drive from the first partition.

Optionally, when the preprocessed data blocks mirrored in the first partition are written to the second partition, the resource utilization of the second partition needs to be monitored in real time. The remaining storage capacity of the second partition may be then acquired according to the resource utilization, and the remaining storage capacity is compared with the preset storage capacity to determine whether the second partition has an idle resource for writing the data to be written. If there is the idle resource, the first writing priorities of the preprocessed data blocks are determined according to the writing sequence in the writing strategy and/or the second writing priorities are determined according to the caching durations of the preprocessed data blocks in the first partition, and the final writing priorities of the preprocessed data blocks are determined according to the first writing priorities and/or the second writing priorities.

Here, the way of determining the final writing priorities of the preprocessed data blocks includes: the first writing priorities or the second writing priorities are used as the final writing priorities, or the highest priorities of the first writing priorities and the second writing priorities are used as the final writing priorities.

Then, the preprocessed data blocks are written, according to the final writing priorities of the preprocessed data blocks and a writing address in the writing strategy, from one of the mirror files in the first partition to a corresponding position of the second partition, thereby realizing adaptive writing of the data and avoiding influence on use by the user, that is, avoiding the problem of increased delayed time caused by responding to a multi-copy writing request of a customer in a staged writing operation processing manner, the performance of the solid state disk is given full play while ensuring accurate writing, thus improving the performance of the full flash hyper-converged all-in-one machine and enhancing the experience of the customer.

In some embodiments, the writing priorities of the preprocessed data blocks are determined according to the caching durations of the preprocessed data blocks in the first partition includes:
  if any preprocessed data block with the caching duration longer than or equal to a maximum delay duration is present in the first partition, the writing priority of the any preprocessed data block is determined to be highest, where the maximum delay duration is acquired in a configuration file of the target solid state drive.

Optionally, in the data writing process, the caching durations of the preprocessed data blocks in the first partition that are not written to the second partition need to be monitored in real time. If there is any preprocessed data block with the caching duration greater than or equal to the maximum delay duration, this preprocessed data block needs to be configured with the highest writing priority such that the operation of writing to the second partition is preferentially performed on it, thereby avoiding influence on the use of the data by the user in the second partition and enhancing the user experience. Then, the performance of the solid state disk is given full play while ensuring accurate writing, thus improving the performance of the full flash hyper-converged all-in-one machine and enhancing the perception of the customer.

In some embodiments, after step 105, the method further includes:
  a preprocessed data block in a writing completion state is acquired as a second data block to be checked;
  the second data block to be checked is checked;
  if the checking of the second data block to be checked is determined, according to a checking result, to be failed, a writing log of the second data block to be checked is acquired in a log partition of the target solid state drive;
  a target mirror file is determined, according to the writing log, from a plurality of mirror files of the first partition; and
  the second data block to be checked is written to the second partition of the target solid state drive from the target mirror file.

A writing checking strategy included in the writing strategy includes a first checking strategy, a second checking strategy, or a third checking strategy. The first checking strategy includes a strategy of not performing data checking if data accuracy checking has been completed in the first partition; the second checking strategy includes a consistency checking strategy; and the third checking strategy includes a data accuracy checking strategy and the consistency checking strategy. The steps of the data accuracy checking strategy are similar to the checking steps performed for the mirrored data of the first partition, which will not be described redundantly here.

Optionally, after the completion of the writing operation of writing the preprocessed data blocks of the data to be written to the second partition from the first partition, the completely written preprocessed data block, i.e., the second data block to be checked, may be further checked to ensure that the preprocessed data blocks of the data to be written are all written integrally and correctly to the second partition.

Corresponding checking is performed, according to the checking strategy included in the writing strategy, on the second data block to be checked, and the checking result is acquired. If the checking result is that the second data block to be checked passes the checking, it indicates that the data block is successfully written to the second partition. If the checking result is that the checking of the second data block to be checked is failed, it indicates that this data block is not written correctly and integrally to the second partition, i.e., the writing is failed. At this point, the writing log of the second data block to be checked needs to be acquired, according to the encoding of the second data block to be checked, from the log partition of the target solid state drive to determine, from the writing log, a historical mirror file used when the second data block to be checked is historically written to the second partition, and a new mirror file other than the historical mirror file is selected as the target mirror file from the plurality of mirror files of the first partition.

Next, a plurality of re-writing requests are initiated within the maximum delay time to re-write the second data block to be checked to the second partition of the target solid state drive from the target mirror file, thereby realizing data repair, until the checking of the second data block to be checked written to the second partition is successful or a re-writing duration reaches the maximum delay time. Thus, it is ensured that the preprocessed data blocks of the data to be written are all written integrally and correctly to the second partition while the use requirement of the user on the written data is met.

In some embodiments, the second data block to be checked is checked includes:
  if a writing strategy of the data to be written includes a consistency checking strategy, a parity check value of the second data block to be checked is calculated; and
  the parity check value of the second data block to be checked is compared with a preset parity value, and consistency checking is performed, according to a comparison result, on the second data block to be checked.

Optionally, when the writing checking strategy included in the writing strategy includes the consistency checking strategy, the checking may be performed by calculating the parity check value of the second data block to be checked and comparing it with the preset parity value on a check disc. If the parity values are identical, the checking is successful, indicating that the processing of writing this data block to the second partition is successful. If the parity values are different, the checking is failed, and it is determined, according to the writing log, that the target mirror file initiates a plurality of requests of re-writing to the second partition within the maximum delay duration until this data block is written successfully.

According to the method provided by the present embodiment, the data consistency checking may be realized by performing parity checking on the data block written to the second partition, thereby ensuring that the preprocessed data blocks of the data to be written are all written integrally and correctly to the second partition and improving the data writing performance.

In some embodiments, the plurality of preprocessed data blocks are mirrored to the first partition of the target solid state drive at step 103 further includes:
  a mirroring request is sent, according to the plurality of preprocessed data blocks, to the first partition such that the first partition calls, according to the mirroring request and a local logical address management table, a target logical storage block to mirror the plurality of preprocessed data blocks to the first partition.

Optionally, after the plurality of preprocessed data blocks are acquired, the mirroring request may be sent to the first partition at any time such that the first partition calls, after receiving the mirroring request and according to the local logical address management table, the target logical storage block in an idle state to perform data mirroring on the preprocessed data blocks.

In some embodiments, the original data blocks in the data to be written are preprocessed to obtain the plurality of preprocessed data blocks of the data to be written includes:
  a configuration file of the target solid state drive is acquired, and a preset data block specification is acquired from the configuration file; according to a data block specification of original data in the data to be written, the original data is sorted;
  the original data is added, according to a sorting result, to a first data queue to obtain a second data queue;
  at least one data block with a data block specification greater than the preset data block specification in the second data queue is segmented according to the preset data block specification;
  the second data queue is updated according to a segmentation result to obtain a third data queue;
  data blocks with a data block specification smaller than the preset data block specification in the third data queue are integrated according to the preset data block specification, and the third data queue is updated according to an integration result to obtain a target data queue; and
  the plurality of preprocessed data blocks are determined according to data blocks in the target data queue.

The preset data block specification is configured according to an integral multiple of a minimum processing unit of an erasing operation, such as 1 time or 2 times the minimum processing unit of the erasing operation.

Optionally, the steps of data segmentation and integration include:
  firstly, the original data blocks in the data to be written are arranged in a descending order by the data block specification and added to the first data queue to obtain the second data queue, and the data blocks are recorded in the second data queue as Mi (M1/M2/M3/M4 . . . ), and sorting determination is performed on the data blocks in the second data queue (new data blocks are continuously added to the second data queue as time goes by);
  the preset data block specification is configured as bs; a data block with the data block specification greater than bs in the second data queue is firstly segmented according to a multiple of bs, and the data blocks obtained by segmentation are updated as new data blocks to the second data queue and sorted to refresh the data block queue, thereby obtaining the third data queue; after all the data blocks greater than bs are processed completely, small data blocks with the data block specification smaller than bs are selected from the latest data block queue (i.e., the third data queue), the data block Mj with the maximum data specification is selected from the small data blocks and a difference Ni between this data block and bs is calculated, the remaining data block queue is refreshed, data blocks closest to the difference Ni are then selected according to a first difference from the third data queue and merged, and the third data queue is updated according to a merging result (two merged small data blocks are updated as a new data block formed by merging); the difference Ni between the merged data block and bs is continuously calculated, and then a data block smaller than the difference Ni is found in the third data queue again; if the data block may be found, merging is continued, and the third data queue is updated according to the merging result, and the difference Ni is calculated until no data block smaller than Ni is found; and the remaining small data blocks are merged according to the merging logic above and the data queue is updated to obtain the target data queue. Then, the data blocks in the target data queue are directly regarded as the preprocessed data blocks.

According to the method provided by the present embodiment, a database which is as small as possible may be centralized to some logical storage blocks, thereby avoiding frequent access bottleneck when a reading request is made subsequently, and the complexity of the logical storage block management may be reduced. The data storage performance is improved, and extra loss caused by solid state disk write amplification is reduced.

In some embodiments, after step 105 is performed, the method further includes: at least one written data block in a writing success state among the plurality of preprocessed data blocks is determined; and a local logical address management table of the first partition is updated according to the at least one written data block, and the at least one written data block is erased in the first partition.

Optionally, in the data writing process, if it is determined that the data to be written has a preprocessed data block that has been successfully written (the writing state is writing completion and the checking is successful) to the second partition, it is regarded as the written data block. The related preprocessed data block in a primary partition may be erased, and the state of the related logical storage block in the primary partition is reset. Meanwhile, the local logical address management table is updated to clear more logical storage blocks for providing the storage space for subsequent data writing.

In some embodiments, before step 103 is performed, the method further includes: an initialization operation is performed on the first partition and the second partition to obtain an initialization result; if warning information is determined to be present in the initialization result, the warning information is matched with at least one preset key word in a knowledge base to obtain at least one target key word matched with the warning information; a candidate processing strategy corresponding to each target key word is determined in the knowledge base; a first target processing strategy corresponding to the warning information is determined according to the candidate processing strategy corresponding to each target key word; and a processing component corresponding to the first target processing strategy is called to process the warning information.

The initialization includes, but is not limited to, storage space initialization and configuration parameter initialization, which is not limited in the present embodiment. In an example, the initialization of the first partition includes at least: the parameter BlockSize (i.e., the Block size of the solid state drive, a minimum processing unit of a deletion operation; a parameter value is decided by a drive specification) in the configuration file is read, and a function trim( ) is called, according to the BlockSize, to perform an erasing action on the primary partition to clear more whole block spaces of which the size is a multiple of the BlockSize; and the local logical address management table is initialized to perform real-time scheduling management on the logical storage blocks in the primary partition at any time, thereby facilitating subsequent rapid data writing. Meanwhile, the related operation is recorded in the log partition.

Optionally, in the initialization process, whether there is warning information in the initialization result is monitored in real time. If there is the warning information, a fault tolerant module is called to perform warning processing.

Here, a mapping relationship between warning information key words and processing strategies and a mapping relationship between each processing strategy and each processing component are pre-stored in the knowledge base in the fault tolerant module to provide an automatic warning processing operation. Here, the mapping relationship may be a many-to-many relationship.

After the warning information is acquired, the fault tolerant module firstly calls all the preset key words in the knowledge base to perform key word matching on the warning information. If there is a target key word matched with the warning information, a candidate processing strategy corresponding to the target key word is acquired until matching with all the preset key words in all knowledge bases is completed.

The candidate processing strategies corresponding to all the target key words are integrated to acquire the first target processing strategy, and the processing component corresponding to the first target processing strategy is called to perform the automatic processing operation on the warning information. The fault tolerance is improved, thus ensuring the data writing performance.

Here, an integration manner may be as follows: the candidate processing strategy occurring the most frequently is selected as the first target processing strategy, or the candidate processing strategies corresponding to all target key words are integrated to obtain a comprehensive processing strategy as the first target processing strategy, which is not limited in the present embodiment.

In some embodiments, the first target processing strategy corresponding to the warning information is determined according to the candidate processing strategy corresponding to each target key word includes: a degree of association between each candidate processing strategy and the warning information is determined according to a number of candidate processing strategies; and a candidate processing strategy with a maximum degree of association is determined as the first target processing strategy.

Optionally, if a certain candidate processing strategy is acquired by matching in the matching process, the degree of association is recorded as r, and in the subsequent matching process, if the candidate processing strategy is acquired again by matching, the degree of association is updated to 2r. The degrees of association of the candidate processing strategies are sequentially recorded in this way until the matching of all the preset key words is completed. At this point, the candidate processing strategy with the maximum degree of association is found out as the first target processing strategy, and the related automatic processing operation is called. The degree of association between each candidate processing strategy and the warning information is determined according to the number of candidate processing strategies so that the processing strategy corresponding to the warning information may be acquired rapidly and accurately, thereby effectively improving the fault tolerant efficiency and further improving the data writing efficiency.

In some embodiments, the method further includes: a processing result of the warning information is acquired; if the processing result of the warning information is successful processing, at least one key word is extracted from the warning information to obtain at least one newly added key word; and the newly added key word and the first target processing strategy are updated to the knowledge base.

Optionally, after the warning information is processed, the processing result also needs to be monitored in real time to determine whether the warning information is processed successfully, i.e., whether the warning information is solved. If the warning information is solved successfully, a warning key word of the warning information and the corresponding first target processing strategy are extracted and added, in the form of the mapping relationship, to the knowledge base. The content of the knowledge base is increased continuously, thereby improving the fault tolerant performance and further improving the data writing performance.

In some embodiments, the method further includes: if the processing result of the warning information is failed processing, the warning information is sent to a client such that the client processes, according to a second target processing strategy, the warning information; warning processing information returned by the client is monitored, and if a processing state of the warning information is determined, according to the warning processing information, to be successful processing, the second target processing strategy is acquired; and the newly added key word extracted from the warning information and the second target processing strategy are updated to the knowledge base.

Optionally, after the warning information is processed, the processing result also needs to be monitored in real time to determine whether the warning information is processed successfully, i.e., whether the warning information is solved. If the warning information is not solved, the solid state disk is marked as temporarily unavailable, and the warning information is sent to the client and waits for being solved by manual intervention.

After the warning information is solved manually, the warning key word of the warning information and the corresponding second target processing strategy are extracted and added to the knowledge base so that a similar problem encountered subsequently may be processed automatically, thereby improving the fault tolerant efficiency and further improving the data writing performance.

In some embodiments, step 103 further includes:

the plurality of preprocessed data blocks are mirrored to a main cache space and an auxiliary cache space of the first partition, where the main cache space and the auxiliary cache space belong to different failure domains; and the plurality of preprocessed data blocks are written to the second partition of the target solid state drive from the first partition includes:

the plurality of preprocessed data blocks are written to the second partition from any one of the main cache space and the auxiliary cache space.

The first partition includes at least a group of main cache space and auxiliary cache space belonging to different failure domains to prevent cached data damage due to loss of copies. Each cache space includes at least one mirror file.

Optionally, when data is mirrored, the preprocessed data blocks may be mirrored to the main cache space and the auxiliary cache space of the first partition. It needs to be noted that in the data mirroring process, if one of the cache spaces is in a redundancy failure state, the preprocessed data blocks may be firstly mirrored to the other cache space, and after the cache space is recovered to be normal, the preprocessed data blocks mirrored in the other cache space may be synchronized to the cache space.

In addition, when data is written, the mirror file may be acquired from any one of the main cache space and the auxiliary cache space such that the preprocessed data blocks are written rapidly and effectively to the second partition. It needs to be noted that in the data mirroring process, if writing data from one of the cache spaces is failed, the data may be written from the other local cache space to ensure that the preprocessed data blocks may still be written and read constantly even in a scenario where a storage node has a fault and redundancy failure is caused. The writing performance is further improved.

In some embodiments, before step 103 is performed, the method further includes:

- division proportions of partitions in the target solid state drive are acquired according to a configuration file of the target solid state drive;
- a capacity of the first partition and a capacity of the second partition are determined according to the division proportions of the partitions; and
- the target solid state drive is partitioned according to the capacity of the first partition and the capacity of the second partition to obtain the first partition and the second partition.

Optionally, before the partitions of the target solid state drive are used, the partitions need to be divided according to the division proportions of the partitions in the configuration file of the target solid state drive.

The configuration file of the target solid state drive is acquired, and the division proportions of the partitions are acquired by parsing from the configuration file. The division proportions of the partitions are calculated such that the capacity of the first partition and the capacity of the second partition are determined according to the division proportions of the partitions. Thus, the corresponding storage areas are divided, according to the capacity of the first partition and the capacity of the second partition, on the target solid state drive, thereby obtaining the first partition and the second partition. In addition, the target solid state drive may further include a log partition. After the first partition and the second partition are obtained, the remaining storage space may be used as the log partition.

In an example, division proportions of the partitions acquired by parsing from the configuration file are: the division proportion of the first partition is 20%, the division proportion of the log partition is 5%, and the division proportion of the second partition is 75%; and 20% of the storage area is defined as the first partition, 5% of the storage area is defined as the log partition, and the remaining storage area is defined as the second partition.

In addition, the configuration file may also be updated in real time according to an actual requirement such that the partitions are re-divided.

According to the method provided by the present embodiment, the target solid state drive may be divided adaptively and accurately according to a division parameter in the configuration file, and then more flexible and reliable reading and writing services may be provided for the user.

According to the data writing method and apparatus, the solid state drive, the electronic device, and the non-transitory readable storage medium provided by the present application, the data to be written is preprocessed first, and the preprocessed data blocks are mirrored to the first partition of the target solid state drive. On the one hand, data redundancy can be realized through data mirroring, and the problem of data write amplification can be avoided through data preprocessing, thereby effectively ensuring effective writing of the data to be written. On the other hand, upon obtaining the mirroring result, whether the data to be written can be mirrored integrally and correctly to the first partition of the target solid state drive can be determined, and whether the data to be written can be written integrally and correctly to the second partition of the target solid state drive from the first partition can be further determined. Thus, the response information can be sent to the client at the mirroring stage. Real-time response can be realized without waiting for the completion of writing of all the data blocks. The delayed response time caused by data block writing can be effectively reduced, thus improving the data writing response efficiency.

Figure 4:
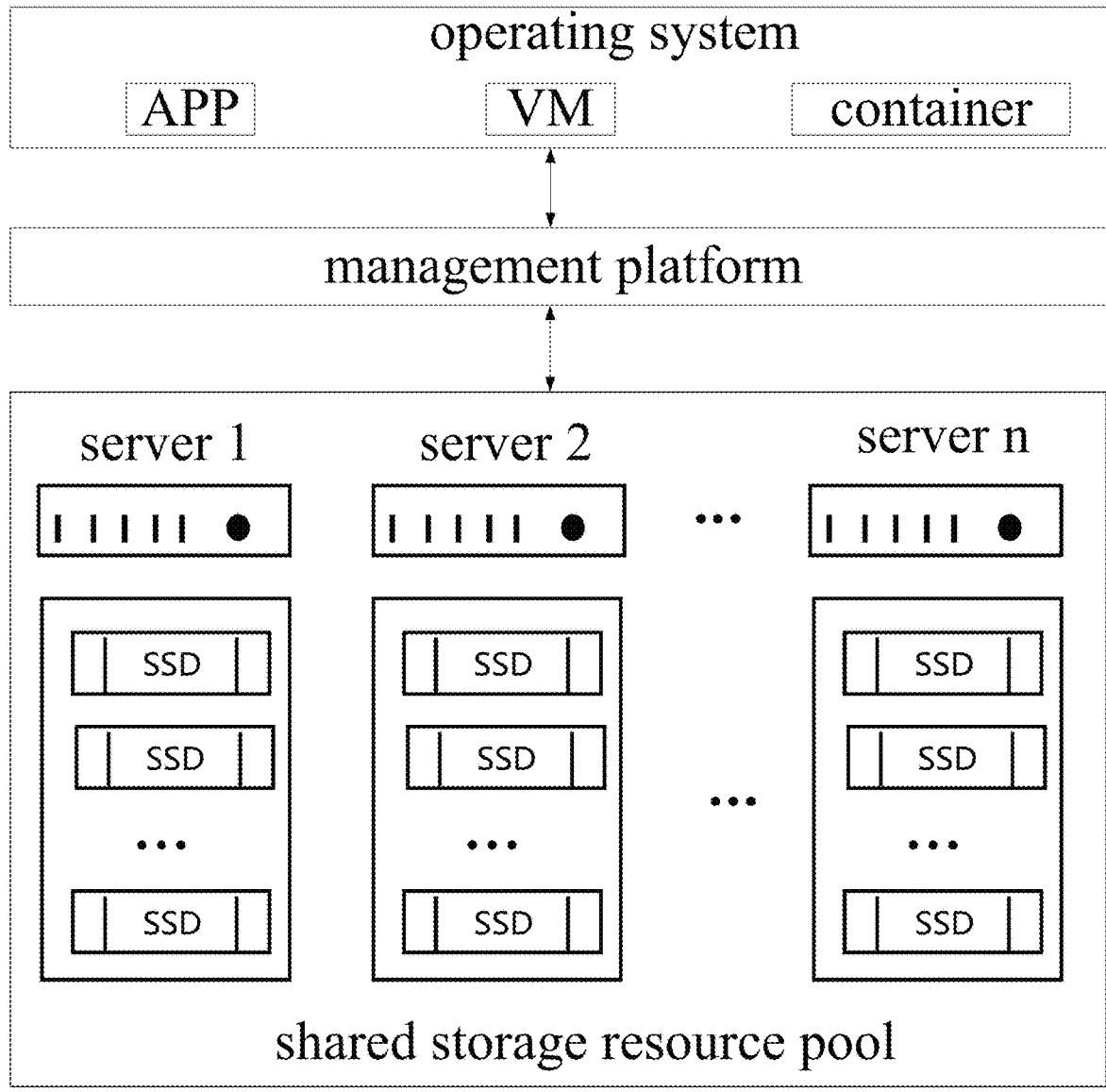

In some embodiments, the data writing method of the present disclosure may be implemented based on a specific system architecture. The system architecture is as shown in FIG. 4. The system architecture includes:

- an operating system, where the operating system includes at least one of an APP, a virtual machine (VM) and a container, and is used for generating a data writing request in response to a user operation, or generating a data writing request at a regular time;
- a management platform, which is in communication connection with the operating system and is used for receiving the data writing request;
- a shared storage resource pool communicatively connected to a management platform, where the shared storage resource pool includes a plurality of servers (such as server 1, server 2, . . . , server n in FIG. 4), each server includes a plurality of solid state drives (SSDs), and the plurality of solid state drives are managed by the management platform; where the management platform is used for receiving the data writing request via the operating system, and according to the data writing request, acquiring data to be written, and pre-processing various original data blocks in the data to be written, obtaining a plurality of preprocessed data blocks, performing read and write operations on the solid state drives according to the plurality of preprocessed data blocks, and each solid state drive has a first partition and a second partition, the read/write operation includes mirroring the plurality of preprocessed data blocks to the first partition of one solid state drive; according to a mirroring result, acquiring response information corresponding to the data to be written, and sending same to the operating system, so that a user learns the response information by means of the operating system.

A data writing apparatus provided by the present application is described below. Mutual reference may be made between the data writing apparatus described below and the data writing method described above.

Figure 5:
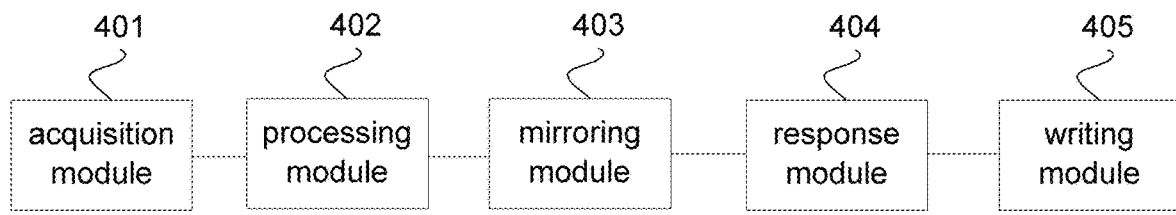
FIG. 5 is a schematic structural diagram of a data writing apparatus provided by the present application.

As shown in FIG. 5, there is shown a schematic structural diagram of the data writing apparatus provided by the present embodiment. The apparatus includes: an acquisition module 401, configured to receive a data writing request sent by a target object, and acquire, according to the data writing request, data to be written; a processing module 402, configured to preprocess original data blocks in the data to be written to obtain a plurality of preprocessed data blocks of the data to be written, where the preprocessing includes at least one of segmentation and integration; a mirroring module 403, configured to mirror the plurality of preprocessed data blocks to a first partition of a target solid state drive; a response module 404, configured to acquire, according to a mirroring result, response information corresponding to the data to be written, and send the response information to the target object, where the response information includes writing state information; and a writing module 405, configured to write the plurality of preprocessed data blocks to a second partition of the target solid state drive from the first partition, where the first partition is a data cache space for caching the data to be written, and the second partition is a data storage space for storing the data to be written.

According to the data writing apparatus provided by the present embodiment, the data to be written is preprocessed first, and the preprocessed data blocks are mirrored to the first partition of the target solid state drive. On the one hand, data redundancy may be realized through data mirroring, and the problem of data write amplification may be avoided through data preprocessing, thereby effectively ensuring effective writing of the data to be written. On the other hand, upon obtaining the mirroring result, whether the data to be written may be mirrored integrally and correctly to the first partition of the target solid state drive may be determined, and whether the data to be written may be written integrally and correctly to the second partition of the target solid state drive from the first partition may be further determined. Thus, the response information may be sent to the client at the mirroring stage. Real-time response may be realized without waiting for the completion of writing of all the data blocks. The delayed response time caused by data block writing may be effectively reduced, thus improving the data writing response efficiency.

The apparatus provided by the present embodiment is configured to perform the method embodiments above, and the flow and the detailed content are as described in the embodiments above, which are no longer repeated here.

The present application further provides a solid state drive, including a control chip and a storage chip. As shown in FIG. 2, the storage chip includes a first partition for providing a data cache, a second partition for providing data writing, and a log partition for providing log storage and strategy data storage. The control chip is configured to perform the method embodiments above, and the flow and the detailed content are as described in the embodiments above, which are no longer repeated here.

According to the solid state drive provided by the present embodiment, the data to be written is preprocessed first, and the preprocessed data blocks are mirrored to the first partition of the target solid state drive. On the one hand, data redundancy may be realized through data mirroring, and the problem of data write amplification may be avoided through data preprocessing, thereby effectively ensuring effective writing of the data to be written. On the other hand, upon obtaining the mirroring result, whether the data to be written may be mirrored integrally and correctly to the first partition of the target solid state drive may be determined, and whether the data to be written may be written integrally and correctly to the second partition of the target solid state drive from the first partition may be further determined. Thus, the response information may be sent to the client at the mirroring stage. Real-time response may be realized without waiting for the completion of writing of all the data blocks. The delayed response time caused by data block writing may be effectively reduced, thus improving the data writing response efficiency.

Figure 6:
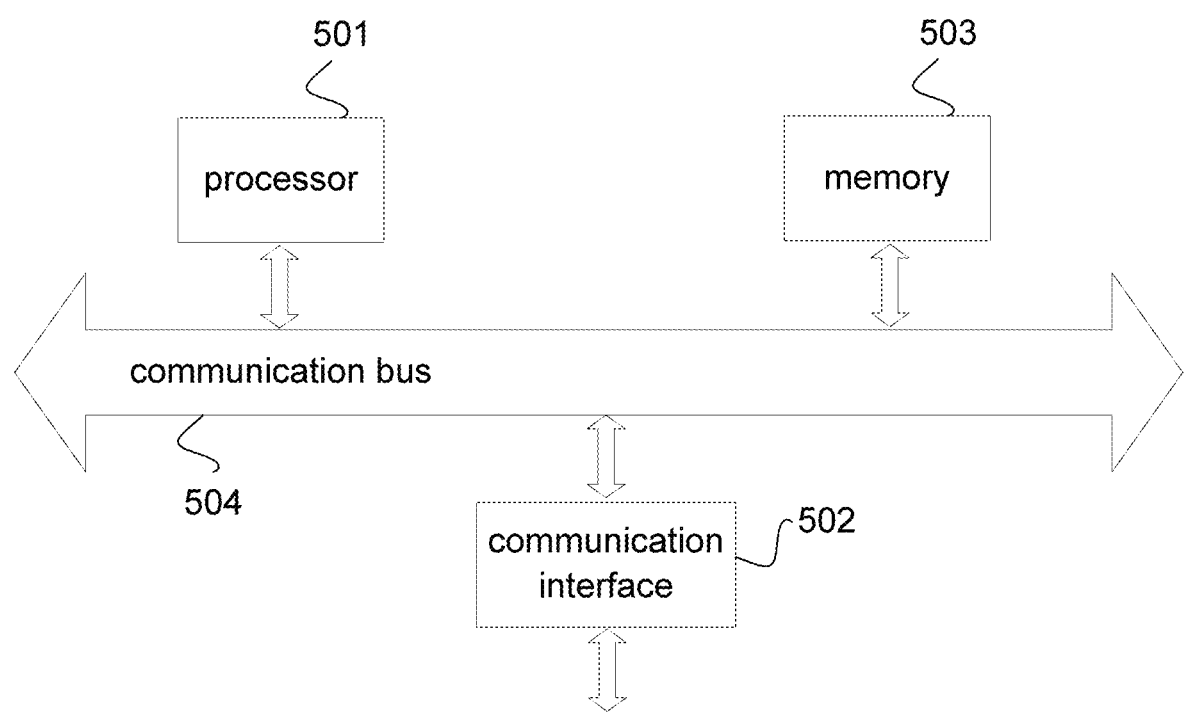
FIG. 6 is a schematic structural diagram of an electronic device provided by the present application.

FIG. 6 illustrates a schematic diagram of a physical structure of an electronic device. As shown in FIG. 6, the electronic device may include a processor 501, a communication interface 502, a memory 503, and a communication bus 504, where the processor 501, the communication interface 502, and the memory 503 communicate with one another through the communication bus 504. The processor 501 may call logic instructions in the memory 503 to perform the data writing method. The method includes: a data writing request sent by a target object is received, and data to be written is acquired according to the data writing request; original data blocks in the data to be written are preprocessed to obtain a plurality of preprocessed data blocks of the data to be written, where the preprocessing includes at least one of segmentation and integration; the plurality of preprocessed data blocks are mirrored to a first partition of a target solid state drive; response information corresponding to the data to be written is acquired according to a mirroring result, and the response information is sent to the target object, where the response information includes writing state information; and the plurality of preprocessed data blocks are written to a second partition of the target solid state drive from the first partition, where the first partition is a data cache space for caching the data to be written, and the second partition is a data storage space for storing the data to be written.

Moreover, the logic instructions in the memory 503 above may be implemented in the form of a software function unit and be stored in a non-transitory readable storage medium when sold or used as a separate product. Based on such an understanding, the technical solutions in the present application essentially, or the part contributing to the prior art, or part of the technical solutions may be embodied in the form of a software product. The computer software product is stored in a storage medium, and includes several instructions to enable a computer device (which may be a personal computer, a server, a network device, or the like) to perform all or part of the steps of the method according to the embodiments of the present application. The foregoing storage medium includes various mediums which may store program codes, such as a USB flash disk, a mobile hard disk drive, a read-only memory (ROM), a random access memory (RAM), a magnetic disk, or an optical disk.

In another aspect, the present application further provides a computer program product, including a computer program which may be stored on a non-transitory readable storage medium and which, when executed by a processor, enables a computer to perform the data writing method provided by the embodiments above. The method includes: a data writing request sent by a target object is received, and data to be written is acquired according to the data writing request; original data blocks in the data to be written are preprocessed to obtain a plurality of preprocessed data blocks of the data to be written, where the preprocessing includes at least one of segmentation and integration; the plurality of preprocessed data blocks are mirrored to a first partition of a target solid state drive; response information corresponding to the data to be written is acquired according to a mirroring result, and the response information is sent to the target object, where the response information includes writing state information; and the plurality of preprocessed data blocks are written to a second partition of the target solid state drive from the first partition, where the first partition is a data cache space for caching the data to be written, and the second partition is a data storage space for storing the data to be written.

In further another aspect, the present application further provides a non-transitory readable storage medium, storing a computer program which, when executed by a processor, implements the data writing method provided by the embodiments above. The method includes: a data writing request sent by a target object is received, and data to be written is acquired according to the data writing request; original data blocks in the data to be written are preprocessed to obtain a plurality of preprocessed data blocks of the data to be written, where the preprocessing includes at least one of segmentation and integration; the plurality of preprocessed data blocks are mirrored to a first partition of a target solid state drive; response information corresponding to the data to be written is acquired according to a mirroring result, and the response information is sent to the target object, where the response information includes writing state information; and the plurality of preprocessed data blocks are written to a second partition of the target solid state drive from the first partition, where the first partition is a data cache space for caching the data to be written, and the second partition is a data storage space for storing the data to be written.

The apparatus embodiment described above is merely schematic, where a unit described as a separate component may or may not be physically separated, and a component displayed as a unit may or may not be a physical unit. That is, the component may be located at one place, or distributed on multiple network units. Part or all of the modules may be selected based on actual needs to achieve the objectives of the solutions of the embodiments. Those of ordinary skill in the art may understand and implement the embodiments without creative efforts.

Through the description of the foregoing implementations, those skilled in the art may clearly understand that the implementations may be implemented by means of software plus a necessary universal hardware platform, or certainly, may be implemented by hardware. Based on such an understanding, the technical solutions above essentially or the part contributing to the prior art may be embodied in the form of a software product. The computer software product may be stored in a non-transitory readable storage medium, such as a ROM/RAM, a magnetic disk, and an optical disk, and includes several instructions to enable a computer device (which may be a personal computer, a server, a network device, or the like) to perform the method according to the embodiments or some of the embodiments.

Finally, it should be noted that the foregoing embodiments are merely used to illustrate the technical solutions of the present application, but are not intended to limit the same. Although the present application is described in detail with reference to the foregoing embodiments, those of ordinary skill in the art should understand that they may still modify the technical solutions described in the foregoing embodiments, or make equivalent replacements on some technical features therein. These modifications or replacements do not make the essence of the corresponding technical solutions deviate from the spirit and scope of the technical solutions of the embodiments of the present application.

What is claimed is:

1. A data writing method, comprising:
   receiving a data writing request sent by a target object, and acquiring, according to the data writing request, data to be written;
   preprocessing original data blocks in the data to be written to obtain a plurality of preprocessed data blocks of the data to be written, wherein the preprocessing comprises at least one of segmentation and integration;
   mirroring the plurality of preprocessed data blocks to a first partition of a target solid state drive;
   acquiring, according to a mirroring result, response information corresponding to the data to be written, and sending the response information to the target object, wherein the response information comprises writing state information; and
   writing the plurality of preprocessed data blocks to a second partition of the target solid state drive from the first partition;
   wherein the first partition is a data cache space for caching the data to be written, and the second partition is a data storage space for storing the data to be written,
   wherein acquiring, according to the mirroring result, the response information corresponding to the data to be written comprises:
   determining, according to the mirroring result, whether at least one abnormal data block is present among the plurality of preprocessed data blocks mirrored in the first partition, wherein the abnormal data block comprises a data block in a mirroring failure state or a data block in a checking failure state; and
   in a case that no abnormal data block is determined to be present among the plurality of preprocessed data blocks mirrored in the first partition, determining the response information as first response information, wherein the first response information comprises response information that a writing state of the data to be written is successful writing,
   wherein the data writing method further comprises:
   in a case that the abnormal data block is determined to be present among the plurality of preprocessed data blocks mirrored in the first partition, acquiring, in a configuration file of the target solid state drive, a maximum delay duration;
   updating, within the maximum delay duration, the plurality of preprocessed data blocks mirrored in the first partition until an updating stop condition is met; and
   acquiring, according to an updating result, the response information;
   wherein the updating stop condition comprises at least one of following: no abnormal data block being present among the plurality of preprocessed data blocks mirrored in the first partition, an updating duration reaching the maximum delay duration.

2. The data writing method according to claim 1, wherein acquiring, according to the updating result, the response information comprises:
   in a case the abnormal data block is determined, according to the updating result, to be present among the plurality of preprocessed data blocks mirrored in the first partition in each updating process, determining the response information as second response information, wherein the second response information comprises response information that the writing state of the data to be written is failed writing; and
   in a case that no abnormal data block is determined, according to the updating result, to be present among the plurality of preprocessed data blocks mirrored in the first partition in at least one updating process, determining the response information as the first response information.

3. The data writing method according to claim 1, wherein determining, according to the mirroring result, whether the at least one abnormal data block is present among the plurality of preprocessed data blocks mirrored in the first partition comprises:
   determining, according to the mirroring result, at least one first data block to be checked in a mirroring success state among the plurality of preprocessed data blocks;
   acquiring a first encoded value and second encoded values of the first data block to be checked, wherein the first encoded value is an encoded value generated before the first data block to be checked is mirrored to the first partition, and the second encoded values are encoded values generated in mirror files in the first partition after the first data block to be checked is mirrored to the mirror files;

checking, according to the first encoded value and the second encoded values of the first data block to be checked, the first data block to be checked to obtain a checking result; and determining, according to the checking result, whether the abnormal data block is present among the plurality of preprocessed data blocks mirrored in the first partition.

4. The data writing method according to claim 3, wherein checking, according to the first encoded value and the second encoded values of the first data block to be checked, the first data block to be checked to obtain the checking result comprises:

comparing the second encoded values of the first data block to be checked in the mirror files to obtain a first comparison result;

in a case that the second encoded values of the first data block to be checked in the mirror files are determined, according to the first comparison result, to be identical, comparing the second encoded value of the first data block to be checked in any mirror file with the first encoded value of the first data block to be checked to obtain a second comparison result; and in a case that the second encoded value is determined, according to the second comparison result, to be identical with the first encoded value, determining the checking result as checking of the first data block to be checked being successful.

5. The data writing method according to claim 4, wherein the data writing method further comprises:

in a case that the second encoded values of the first data block to be checked in the mirror files are determined, according to the first comparison result, to be different, comparing the second encoded values of the first data block to be checked in the mirror files with the first encoded value of the first data block to be checked to obtain third comparison results; and in a case that the second encoded values of the first data block to be checked in the mirror files are all determined, according to the third comparison results, to be different from the first encoded value of the first data block to be checked, determining the checking result as checking of the first data block to be checked being failed;

wherein updating, within the maximum delay duration, the plurality of preprocessed data blocks mirrored in the first partition comprises:

re-mirroring, within the maximum delay duration, the first data block to be checked to the mirror files of the first partition.

6. The data writing method according to claim 5, wherein the data writing method further comprises:

in a case that a first mirror file and a second mirror file are determined, according to the third comparison results, to be present in the first partition, determining the checking result as checking of the first data block to be checked being failed, wherein the second encoded value of the first data block to be checked in the first mirror file is identical with the first encoded value of the first data block to be checked in the first mirror file, and the second encoded value of the first data block to be checked in the second mirror file is different from the first encoded value of the first data block to be checked in the second mirror file;

wherein updating, within the maximum delay duration, the plurality of preprocessed data blocks mirrored in the first partition comprises:

synchronizing, within the maximum delay duration, the plurality of preprocessed data blocks mirrored in the first mirror file to the second mirror file.

7. The data writing method according to claim 1, wherein writing the plurality of preprocessed data blocks to the second partition of the target solid state drive from the first partition comprises:

in a case that a remaining storage capacity of the second partition is monitored to be greater than or equal to a preset storage capacity, acquiring, according to the data writing request, a writing strategy of the data to be written;

determining, according to at least one of a writing sequence in the writing strategy and caching durations of the preprocessed data blocks in the first partition, writing priorities of the preprocessed data blocks; and writing, according to the writing priorities, the preprocessed data blocks to the second partition of the target solid state drive from the first partition.

8. The data writing method according to claim 7, wherein determining, according to the caching durations of the preprocessed data blocks in the first partition, the writing priorities of the preprocessed data blocks comprises:

in a case that any preprocessed data block with the caching duration longer than or equal to a maximum delay duration is present in the first partition, determining that the writing priority of the any preprocessed data block is highest, wherein the maximum delay duration is acquired in a configuration file of the target solid state drive.

9. The data writing method according to claim 1, wherein after writing the plurality of preprocessed data blocks to the second partition of the target solid state drive from the first partition, the data writing method further comprises:

acquiring a preprocessed data block in a writing completion state as a second data block to be checked;

checking the second data block to be checked;

in a case that checking of the second data block to be checked is determined, according to a checking result, to be failed, acquiring, in a log partition of the target solid state drive, a writing log of the second data block to be checked;

determining, according to the writing log, a target mirror file from a plurality of mirror files of the first partition; and writing the second data block to be checked to the second partition of the target solid state drive from the target mirror file.

10. The data writing method according to claim 9, wherein checking the second data block to be checked comprises:

in a case that a writing strategy of the data to be written comprises a consistency checking strategy, calculating a parity check value of the second data block to be checked; and comparing the parity check value of the second data block to be checked with a preset parity value, and performing, according to a comparison result, consistency check on the second data block to be checked.

11. The data writing method according to claim 1, wherein mirroring the plurality of preprocessed data blocks to the first partition of the target solid state drive comprises:

sending, according to the plurality of preprocessed data blocks, a mirroring request to the first partition such that the first partition calls, according to the mirroring request and a local logical address management table, a target logical storage block to mirror the plurality of preprocessed data blocks to the first partition.

12. The data writing method according to claim 11, wherein preprocessing the original data blocks in the data to be written to obtain the plurality of preprocessed data blocks of the data to be written comprises:
acquiring a configuration file of the target solid state drive, and acquiring a preset data block specification from the configuration file;
sorting, according to a data block specification of original data in the data to be written, the original data;
adding, according to a sorting result, the original data to a first data queue to obtain a second data queue;
segmenting, according to the preset data block specification, at least one data block with a data block specification greater than the preset data block specification in the second data queue;
updating, according to a segmentation result, the second data queue to obtain a third data queue;
integrating, according to the preset data block specification, data blocks with a data block specification smaller than the preset data block specification in the third data queue, and updating, according to an integration result, the third data queue to obtain a target data queue; and
determining, according to data blocks in the target data queue, the plurality of preprocessed data blocks.

13. The data writing method according to claim 1, wherein the data writing method further comprises at least one of following:
determining at least one written data block in a writing success state among the plurality of preprocessed data blocks; and
updating, according to the at least one written data block, a local logical address management table of the first partition, and erasing, in the first partition, the at least one written data block;
before mirroring the plurality of preprocessed data blocks to the first partition of the target solid state drive,
performing an initialization operation on the first partition and the second partition to obtain an initialization result; and
in a case that warning information is determined to be present in the initialization result, matching the warning information with at least one preset key word in a knowledge base to obtain at least one target key word matched with the warning information; and
determining, in the knowledge base, a candidate processing strategy corresponding to each target key word; and
determining, according to the candidate processing strategy corresponding to each target key word, a first target processing strategy corresponding to the warning information; and calling at least one processing component corresponding to the first target processing strategy to process the warning information.

14. The data writing method according to claim 13, wherein determining, according to the candidate processing strategy corresponding to each target key word, the first target processing strategy corresponding to the warning information comprises:
determining, according to a number of candidate processing strategies, a degree of association between each candidate processing strategy and the warning information; and
determining a candidate processing strategy with a maximum degree of association as the first target processing strategy,
wherein the data writing method further comprises:
acquiring a processing result of the warning information;
in a case that the processing result of the warning information is successful processing, extracting at least one key word from the warning information to obtain at least one newly added key word; and
updating the newly added key word and the first target processing strategy to the knowledge base,
wherein the data writing method further comprises:
in a case that the processing result of the warning information is failed processing, sending the warning information to a client such that the client processes, according to a second target processing strategy, the warning information;
monitoring warning processing information returned by the client, and in a case that a processing state of the warning information is determined, according to the warning processing information, to be successful processing, acquiring the second target processing strategy; and
updating at least one newly added key word extracted from the warning information and the second target processing strategy to the knowledge base.

15. The data writing method according to claim 1, wherein mirroring the plurality of preprocessed data blocks to the first partition of the target solid state drive comprises:
mirroring the plurality of preprocessed data blocks to a main cache space and an auxiliary cache space of the first partition, wherein the main cache space and the auxiliary cache space belong to different failure domains; and
writing the plurality of preprocessed data blocks to the second partition of the target solid state drive from the first partition comprises:
writing the plurality of preprocessed data blocks to the second partition from any one of the main cache space and the auxiliary cache space,
wherein before mirroring the plurality of preprocessed data blocks to the first partition of the target solid state drive, the data writing method further comprises:
acquiring, according to a configuration file of the target solid state drive, division proportions of partitions in the target solid state drive;
determining, according to the division proportions of the partitions, a capacity of the first partition and a capacity of the second partition; and
partitioning, according to the capacity of the first partition and the capacity of the second partition, the target solid state drive to obtain the first partition and the second partition.

16. A solid state drive, comprising a control chip and a storage chip, wherein the storage chip comprises a first partition, a second partition, and a log partition; and
when a computer program is executed by the control chip, the computer program is configured to cause the control chip to:
receive a data writing request sent by a target object, and acquire, according to the data writing request, data to be written;
preprocess original data blocks in the data to be written to obtain a plurality of preprocessed data blocks of the data to be written, wherein the preprocessing comprises at least one of segmentation and integration;
mirror the plurality of preprocessed data blocks to a first partition of a target solid state drive;
acquire, according to a mirroring result, response information corresponding to the data to be written, and send the response information to the target object, wherein the response information comprises writing state information; and write the plurality of preprocessed data blocks to a second partition of the target solid state drive from the first partition;

wherein the first partition is a data cache space for caching the data to be written, and the second partition is a data storage space for storing the data to be written, wherein acquiring, according to the mirroring result, the response information corresponding to the data to be written comprises:

determining, according to the mirroring result, whether at least one abnormal data block is present among the plurality of preprocessed data blocks mirrored in the first partition, wherein the abnormal data block comprises a data block in a mirroring failure state or a data block in a checking failure state; and in a case that no abnormal data block is determined to be present among the plurality of preprocessed data blocks mirrored in the first partition, determining the response information as first response information, wherein the first response information comprises response information that a writing state of the data to be written is successful writing, wherein the data writing method further comprises:

in a case that the abnormal data block is determined to be present among the plurality of preprocessed data blocks mirrored in the first partition, acquiring, in a configuration file of the target solid state drive, a maximum delay duration;

updating, within the maximum delay duration, the plurality of preprocessed data blocks mirrored in the first partition until an updating stop condition is met; and acquiring, according to an updating result, the response information;

wherein the updating stop condition comprises at least one of following: no abnormal data block being present among the plurality of preprocessed data blocks mirrored in the first partition, an updating duration reaching the maximum delay duration.

17. An electronic device, comprising a memory, a processor, and a computer program stored on the memory and runnable on the processor, wherein when the computer program is executed by the processor, the computer program is configured to cause the processor to:

receive a data writing request sent by a target object, and acquire, according to the data writing request, data to be written;

preprocess original data blocks in the data to be written to obtain a plurality of preprocessed data blocks of the data to be written, wherein the preprocessing comprises at least one of segmentation and integration;

mirror the plurality of preprocessed data blocks to a first partition of a target solid state drive;

acquire, according to a mirroring result, response information corresponding to the data to be written, and send the response information to the target object, wherein the response information comprises writing state information; and write the plurality of preprocessed data blocks to a second partition of the target solid state drive from the first partition;

wherein the first partition is a data cache space for caching the data to be written, and the second partition is a data storage space for storing the data to be written, wherein acquiring, according to the mirroring result, the response information corresponding to the data to be written comprises:

determining, according to the mirroring result, whether at least one abnormal data block is present among the plurality of preprocessed data blocks mirrored in the first partition, wherein the abnormal data block comprises a data block in a mirroring failure state or a data block in a checking failure state; and in a case that no abnormal data block is determined to be present among the plurality of preprocessed data blocks mirrored in the first partition, determining the response information as first response information, wherein the first response information comprises response information that a writing state of the data to be written is successful writing, wherein the data writing method further comprises:

in a case that the abnormal data block is determined to be present among the plurality of preprocessed data blocks mirrored in the first partition, acquiring, in a configuration file of the target solid state drive, a maximum delay duration;

updating, within the maximum delay duration, the plurality of preprocessed data blocks mirrored in the first partition until an updating stop condition is met; and acquiring, according to an updating result, the response information;

wherein the updating stop condition comprises at least one of following: no abnormal data block being present among the plurality of preprocessed data blocks mirrored in the first partition, an updating duration reaching the maximum delay duration.

18. A non-transitory readable storage medium, storing a computer program which, when executed by a processor, implements the data writing method according to claim 1.

* * * * *